United States Patent
Granshaw et al.

(10) Patent No.: US 10,102,036 B2
(45) Date of Patent: Oct. 16, 2018

(54) PROVIDING ADDITIONAL THREAD CONTEXT TO ASSIST MEMORY LOCALITY

(71) Applicant: International Business Machines Corporation, Armonk, NY (US)

(72) Inventors: David Granshaw, Eastleigh (GB); Samuel T. Massey, Southampton (GB); Daniel J. McGinnes, Southampton (GB); Martin A. Ross, Gosport (GB); Richard G. Schofield, Eastleigh (GB); Craig H. Stirling, Hedge End (GB)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 15/016,334

(22) Filed: Feb. 5, 2016

(65) Prior Publication Data
US 2017/0228256 A1    Aug. 10, 2017

(51) Int. Cl.
*G06F 9/46* (2006.01)
*G06F 9/50* (2006.01)

(52) U.S. Cl.
CPC .... *G06F 9/5033* (2013.01); *G06F 2209/5018* (2013.01)

(58) Field of Classification Search
None
See application file for complete search history.

(56) References Cited

U.S. PATENT DOCUMENTS

| | | | |
|---|---|---|---|
| 5,745,778 A * | 4/1998 | Alfieri | G06F 9/4881 711/133 |
| 6,895,584 B1 * | 5/2005 | Belkin | G06F 9/5027 718/100 |
| 7,389,506 B1 | 6/2008 | Miller et al. | |
| 7,584,342 B1 * | 9/2009 | Nordquist | G06F 9/3851 712/22 |
| 8,732,713 B2 | 5/2014 | Coon et al. | |
| 9,250,953 B2 * | 2/2016 | Kipp | G06F 9/46 |
| 2002/0078124 A1 * | 6/2002 | Baylor | G06F 9/3851 718/106 |
| 2004/0194093 A1 * | 9/2004 | Koutharapu | G06F 9/505 718/100 |
| 2005/0210468 A1 * | 9/2005 | Chung | G06F 9/4843 718/100 |
| 2006/0080663 A1 * | 4/2006 | Pospiech | G06F 9/5027 718/100 |
| 2008/0059712 A1 | 3/2008 | Fedorova | |
| 2008/0072236 A1 * | 3/2008 | Pope | G06F 9/4843 718/108 |
| 2009/0300643 A1 * | 12/2009 | Gove | G06F 9/52 718/106 |

(Continued)

OTHER PUBLICATIONS

Gautier, et al., "Locality-Aware Work Stealing on Multi-CPU and Multi-GPU Architectures", HAL archives-ouvertes, Submitted on Jan. 24, 2013, 13 pages.

(Continued)

*Primary Examiner* — Dong Kim
(74) *Attorney, Agent, or Firm* — Isaac J. Gooshaw; Lance J. Hochhauser (57) ABSTRACT

Allocating threads to processors based, at least in part, on identifiers for thread sets and applications. A thread is paired with an application and, using the identifier for the application, an ID pairing is allocated to a processor.

20 Claims, 3 Drawing Sheets

(56) References Cited

U.S. PATENT DOCUMENTS

2014/0164743 A1    6/2014    Giroux et al.
2015/0160970 A1    6/2015    Nugteren et al.

OTHER PUBLICATIONS

Huang, et al., "A Locality-Aware Dynamic Thread Scheduler for GPGPUs", 2013 International Conference on Parallel and Distributed Computing, Applications and Technologies, © 2013 IEEE, pp. 254-258.

Maier, et al., "Locality Aware DAG-Scheduling for LU-Decomposition", 2015 IEEE 29th International Parallel and Distributed Processing Symposium, © 2015 IEEE, pp. 82-92.

"Processor affinity", From Wikipedia, the free encyclopedia, last modified on Apr. 22, 2015, 3 pages.

"CPU Scheduling", Operating Systems, 22 pages, printed Nov. 18, 2015.

"Class ThreadGroup", ThreadGroup (Java Plateform SE 7), 14 pages, printed Nov. 18, 2015.

\* cited by examiner

PROVIDING ADDITIONAL THREAD CONTEXT TO ASSIST MEMORY LOCALITY

BACKGROUND

The present invention relates generally to the field of task management or control, and more particularly to process scheduling.

A central processing unit ("CPU") scheduler gives system resource access to threads and processes. The CPU dispatcher performs load balancing for processes running on a set of processors. Memory locality is a phenomenon by which processes running more than once on the same processor improves performance for that process. Non-uniform memory access ("NUMA") architectures attempt to maintain continuity among various processes and processors. NUMA architectures can also define process affinity for selected processors.

A thread is a component of a process that is executed to perform instructions. Threads can be aggregated and/or assembled into various types of bundles. Thread pools consist of various threads and/or sets of threads (sometimes also called thread sets) that can perform concurrent tasks. Thread sets associate and organize threads that are related. Threads belonging to a thread set generally perform the same or similar processing. Thread sets can be organized into hierarchical structures.

Multiple thread pools may exist in a middleware system. Each thread pool consists of a set of threads in a thread set. Various applications can use a thread pool and any one thread in the thread pool can run various applications and/or workflows.

SUMMARY

According to an aspect of the present invention, there is a method, computer program product, and/or system that performs the following operations (not necessarily in the following order): (i) identifying a thread set for running at least a first application; (ii) generating a first identification corresponding to the thread set; (iii) requesting a first thread from the thread set; (iv) generating a second identification corresponding to the first application; (v) storing the second identification on the first thread; (vi) allocating a first ID pairing to a first processor, wherein the first ID pairing includes: (a) the first identification, and (b) the second identification; and (vii) executing, on the first processor, the first thread based, at least in part, on the first ID pairing. At least executing the first thread is performed by computer software running on computer hardware.

DETAILED DESCRIPTION

Allocating threads to processors based, at least in part, on identifiers for thread sets and applications. A thread is paired with an application and, using the identifier for the application, an ID pairing is allocated to a processor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
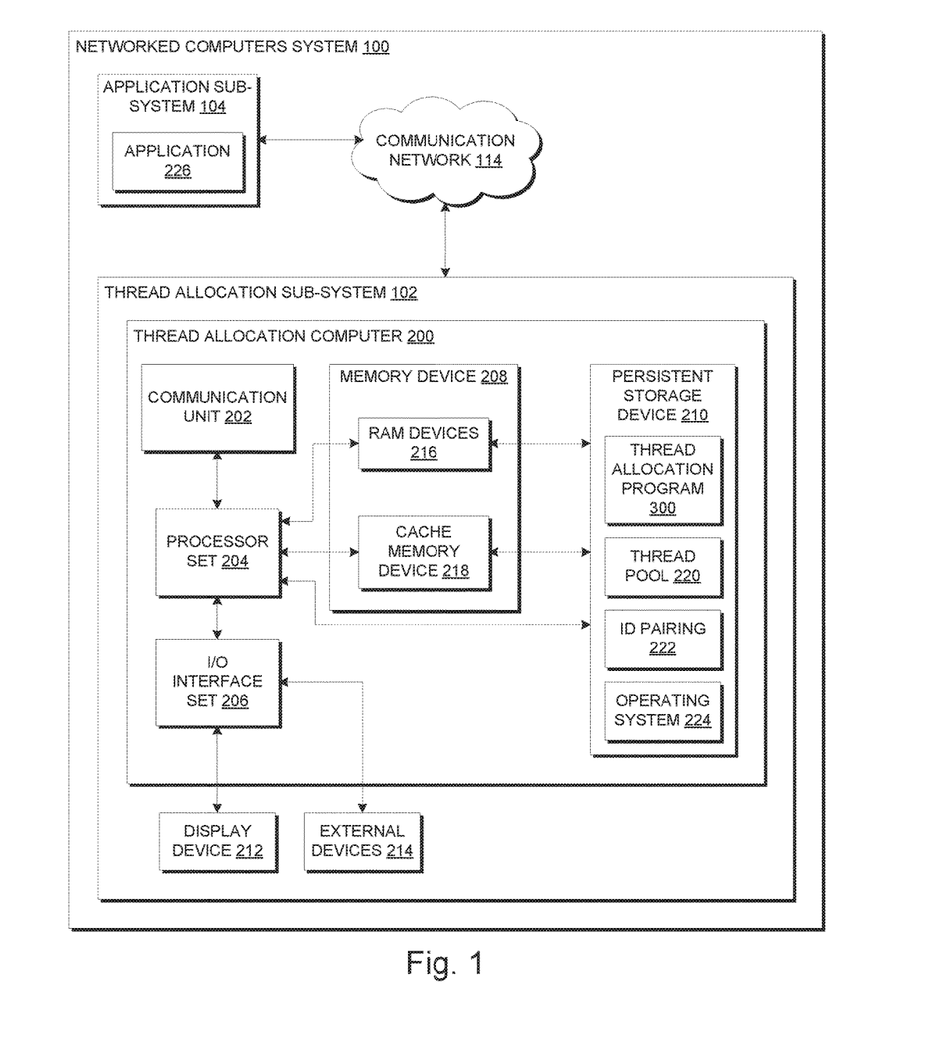
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: thread allocation sub-system 102; application sub-system 104; and communication network 114. Thread allocation sub-system 102 contains: thread allocation computer 200; display device 212; and external devices 214. Thread allocation computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: thread pool 220; identification (ID) pairing 222; operating system 224; and thread allocation program 300. Application sub-system 104 contains: application 226.

Thread pool 220 is a thread pool that contains a set of threads. Thread pool 220 can also contain a set of thread sets. ID pairing 222 corresponds to identifications for a paired application and thread set. Operating system 224 is an operating system for thread allocation sub-system 102. Application 226 is an application to be run.

Thread allocation sub-system 102 is, in many respects, representative of the various computer sub-systems in the present invention. Accordingly, several portions of thread allocation sub-system 102 will now be discussed in the following paragraphs.

Thread allocation sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Thread allocation program 300 is a collection of machine readable instructions and/or data that is used to create, manage, and control certain software functions that will be discussed in detail, below, in the Example Embodiment sub-section of this Detailed Description section.

Thread allocation sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between thread allocation sub-system 102 and client sub-systems.

Thread allocation sub-system 102 is shown as a block diagram with many double arrows. These double arrows (no separate reference numerals) represent a communications fabric, which provides communications between various components of thread allocation sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for thread allocation sub-system 102; and/or (ii) devices external to thread allocation sub-system 102 may be able to provide memory for thread allocation sub-system 102.

Thread allocation program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Thread allocation program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to thread allocation sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with thread allocation computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., thread allocation program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 2:
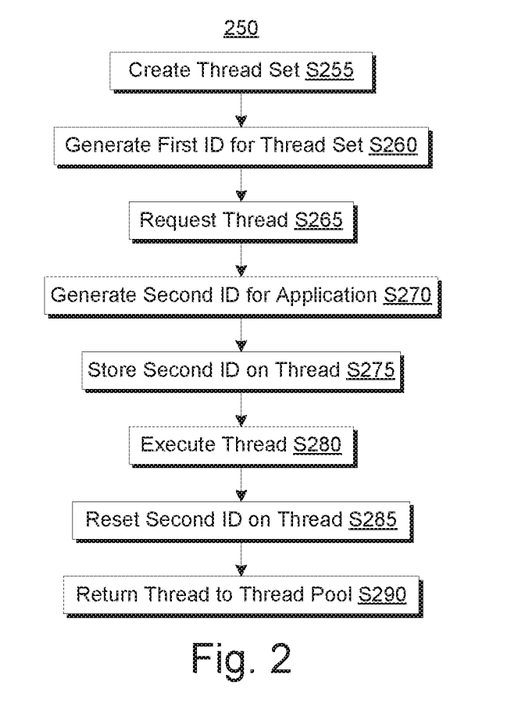
FIG. 2 is a flowchart showing a first embodiment method performed, at least in part, by the first embodiment system.
Figure 3:
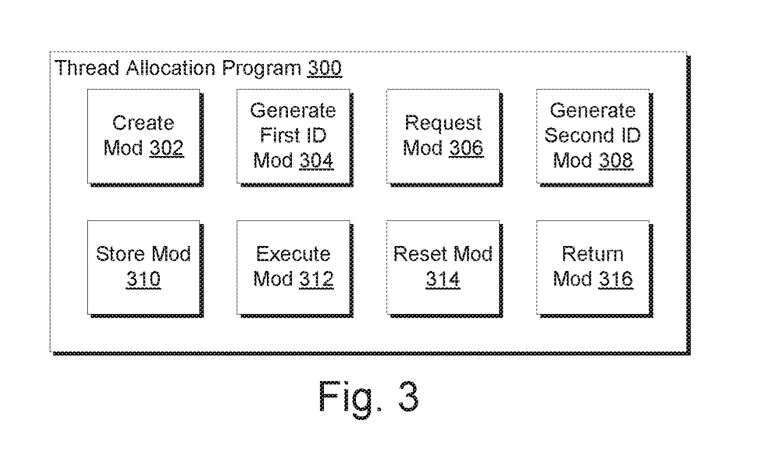
FIG. 3 is a block diagram view of a machine logic (e.g., software) portion of the first embodiment system.

FIG. 2 shows flowchart 250 depicting a method according to the present invention. FIG. 3 shows thread allocation program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example thread allocation sub-system 102 runs application 226 using thread pool 220 and processor set 204.

Processing begins at operation S255, where create module ("mod") 302 creates a thread set. A thread set is a logical grouping of threads. A thread set is sometimes also called a thread group. A set of threads in a thread pool can be logically grouped into a lower level construct. In some embodiments of the present invention, create mod 302 creates a thread set using a set of threads in a thread pool. In this example, create mod 302 creates a thread set within thread pool 220 using a set of threads from thread pool 220.

Processing proceeds to operation S260, where generate first identification ("ID") mod 304 generates a first identification ("ID") for a thread set. A first ID is sometimes also called a universally unique identifier ("UUID"). In some embodiments of the present invention, a first ID is a system-wide unique ID. In further embodiments, generate first ID mod 304 requests a first ID from an operating system ("OS"). In other embodiments, generate first ID mod 304 stores a first ID for a thread set on each thread in the thread set. In this example, generate first ID mod 304 generates a first ID for the thread set (created in operation S255); here, generate first ID mod 304 requests a first ID from operating system 224.

Processing proceeds to operation S265, where request mod 306 requests a thread. In some embodiments, request mod 306 requests a thread from a thread set. In further embodiments, request mod 306 requests a thread for an application. In other examples, request mod 306 determines that a thread from a thread pool has not been previously requested for an application. In this example, request mod 306 requests a thread from the thread set in thread pool 220 for application 226.

Processing proceeds to operation S270, where generate second identification ("ID") mod 308 generates a second ID for an application. A second ID is sometimes also called a UUID. In some embodiments of the present invention, a second ID is a system-wide unique ID. In further embodiments, generate second ID mod 308 requests a second ID from an OS. In this example, generate second ID mod 308 generates a second ID for application 226; here, generate second ID mod 308 requests the second ID from operating system 224.

Processing proceeds to operation S275, where store mod 310 stores a second ID. In some embodiments of the present invention, store mod 310 stores a second ID on a thread. In further embodiments, store mod 310 stores a second ID on a thread to pair a thread with an application. In this example, store mod 310 stores the second ID for application 226 on the thread from thread pool 220.

Processing proceeds to operation S280, where execute mod 312 executes a thread. In this example, execute mod 312 executes the thread from thread pool 220 on a processor in processor set 204. In some embodiments of the present invention, execute mod 312 causes a thread to execute a sequence of instructions that are dispatched and scheduled. In some embodiments, execute mod 312 uses a first ID and a second ID to execute a thread. In some embodiments, execute mod 312 selects a processor on which to execute a thread. In alternative embodiments, execute mod 312 selects a processor on which to execute a thread based, at least in part, on an improvement of a memory locality. In other embodiments, execute mod 312 retains an ID pairing in a cache to improve efficiency.

In some embodiments of the present invention, execute mod 312 improves efficiency through inferred knowledge of memory locality. In some embodiments, execute mod 312 stores data associated with an ID pairing to a memory. Alternatively, execute mod 312 stores data associated with an ID pairing to a cache. In other embodiments, a first memory is located closer to a first processor and a second memory is located closer to a second processor. In further embodiments, a first processor requires additional time to reach data in a second memory, as compared to the time required to reach data in a first memory. In some embodiments, a time required for a first processor to access a first memory is dependent on a memory structure. Alternatively, a first processor must access a second memory through a main RAM.

In further embodiments, execute mod 312 selects a processor on which to execute a thread based, at least in part, on a "round robin" process. A round robin process means that a set of ID pairings are allocated to a set of processors in an evenly distributed manner. For example, one possible allocation of ID pairings across various processors is depicted in FIG. 4.

Figure 4:
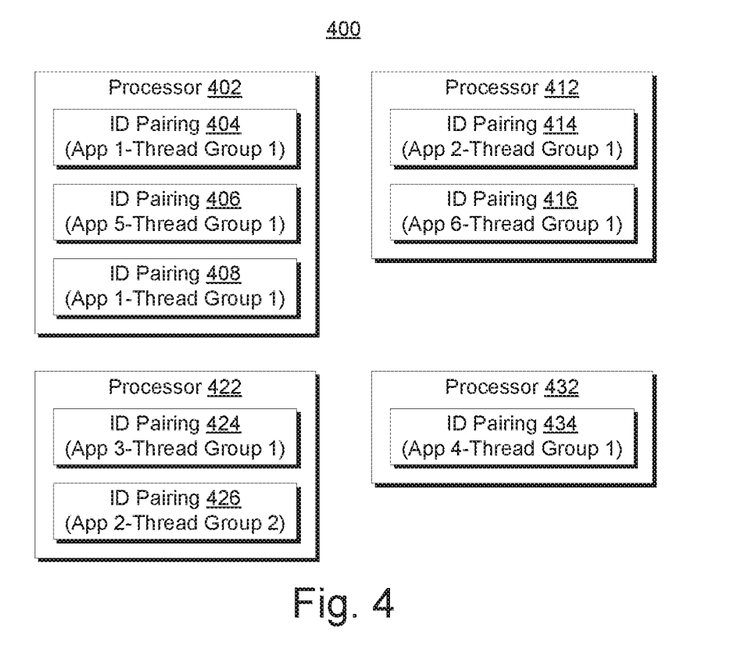
FIG. 4 is depicts a processor environment of a second embodiment of a system according to the present invention.

FIG. 4 represents processor environment 400. In some embodiments of the present invention, processor environment 400 exists within processor set 204. Processor environment 400 depicts: processor 402; processor 412; processor 422; and processor 432. Processor 402 includes: identification (ID) pairing 404; identification (ID) pairing 406; and identification (ID) pairing 408. Processor 412 includes: identification (ID) pairing 414; and identification (ID) pairing 416. Processor 422 includes: identification (ID) pairing 424; and identification (ID) pairing 426. Processor 432 includes: identification (ID) pairing 434. Each ID pairing represents a pairing of an application with a thread from a thread group. ID pairing 404 represents a pairing of application ("app") 1 and a thread from thread set 1; ID pairing 406 represents a pairing of app 5 and a thread from thread set 1; ID pairing 408 represents a pairing of app 1 and a thread from thread set 1; ID pairing 414 represents a pairing of app 2 and a thread from thread set 1; ID pairing 416 represents a pairing of app 6 and a thread from thread set 1; ID pairing 424 represents a pairing of app 3 and a thread from thread set 1; ID pairing 426 represents a pairing of app 2 and a thread from thread set 2; and ID pairing 436 represents a pairing of app 4 and a thread from thread set 1.

In processor environment 400, ID pairings are allocated to processors in a "round robin" fashion. First, execute mod 312 allocates ID pairing 404 to processor 402. Then, execute mod 312 allocates ID pairing 414 to processor 412; execute mod 312 allocates ID pairing 424 to processor 422; and execute mod 312 allocates ID pairing 434 to processor 432. After execute mod 312 allocates an ID pairing to each processor, execute mod 312 allocates ID pairing 406 to processor 402; then execute mod 312 allocates ID pairing 416 to processor 412. Additionally, for additional occurrences of an application and thread set pairing (e.g., ID pairing 408, having the same first ID and second ID as ID pairing 404) already allocated to a processor, execute mod 312 allocates the additional occurrence to the processor to which the original occurrence is allocated based, at least in part, on identifying a match of the first ID and the second ID. Therefore, execute mod 312 allocates ID pairing 408 to processor 402 because execute mod 312 previously allocated ID pairing 404 to processor 402. Finally, execute mod 312 allocates ID pairing 426 to processor 422; ID pairing 426 is distinct from ID pairing 414 because the first ID for ID pairing 426 (for thread set 2) is different from the first ID for ID pairing 414 (for thread set 1).

An alternative allocation scheme for processor environment 400 is to allocate various ID pairings to a first processor (e.g., processor 402) until the first processor is full, then to move to a second processor (e.g., processor 412). Another alternative allocation scheme for processor environment 400 is to allocate various ID pairings to a least busy processor. A further alternative allocation scheme includes as a factor other processing occurring on a set of processors. In some other embodiments, only a second ID for an ID pairing is analyzed to determine a processor on which to allocate an ID pairing.

Processing proceeds to operation S285, where reset mod 314 resets a second ID on a thread. In some embodiments of the present invention, reset mod 314 resets a second ID on a thread to release the thread. In further embodiments, reset mod 314 resets a second ID on a thread to allow reuse of the thread by a new occurrence of operation S275. In this example, reset mod 314 resets the second ID (generated in operation S270) stored on the thread (in operation S275).

Processing terminates at operation S290, where return mod 316 returns a thread to a thread set. In some embodiments of the present invention, return mod 316 returns a thread to a thread set to allow reuse of the thread by a new occurrence of operation S275. In this example, return mod 316 returns to the thread set in thread pool 220 the thread for which the second ID was reset (in operation S285).

Some embodiments of the present invention recognize the following facts, potential problems, and/or potential areas for improvement with respect to the current state of the art: (i) universally unique identifiers ("UUIDs") are used to identify objects; and/or (ii) ID pairings are processed using threads.

In some embodiments of the present invention, the following process operations are performed: (i) creating a thread set; (ii) generating a first ID for a thread set; (iii) requesting a thread; (iv) generating a second ID for an application; (v) storing a second ID; (vi) executing an ID pairing; (vii) resetting a second ID; and/or (viii) returning a thread to a thread set.

Some embodiments of the present invention may include one, or more, of the following features, characteristics, and/or advantages: (i) passing additional data from a thread to a central processing unit ("CPU") dispatcher; (ii) improving workload placement for a set of threads; (iii) driving improved workload placement through inferred knowledge of memory locality; (iv) defining processing on the thread-level; (v) defining processing for a thread based, at least in part, on a UUID for an application; and/or (vi) enabling a dispatcher to use thread-level processing definitions to improve workload placement.

In some embodiments of the present invention, inferred knowledge of memory locality relates to an ability to access allocated memory more efficiently from a processor on which an ID pairing was previously processed. For example, a first ID pairing (having a first ID and a second ID) is allocated to a first processor and a first memory is allocated to the first processor. In this example, a second ID pairing (also having the first ID and the second ID) is also allocated to the first processor and can access the first memory. Alternatively, a third ID pairing (also having the first ID and the second ID) is allocated to a second processor and cannot access the first memory.

Some embodiments of the present invention may include one, or more, of the following features, characteristics, and/or advantages: (i) augmenting a thread metadata with information that identifies a subset of processing; (ii) storing a set of UUIDs in a thread metadata; (iii) using a thread metadata to identify a subset of processing; (iii) using a UUID for each thread in a thread set; and/or (iv) using each thread in a thread set to perform similar processing.

Some embodiments of the present invention may include one, or more, of the following features, characteristics, and/or advantages: (i) using a UUID to identify a subset of threads within a thread set (sometimes also called a thread-group processing subset); (ii) using a thread-group processing subset to perform common processing tasks; (iii) using a thread-group processing subset to perform common processing tasks to drive optimization of processing; (iv) dynamically modifying a thread-group processing subset; (v) dynamically setting a UUID for an application on a thread-group processing subset based, at least in part, on the application; (vi) using a thread-group processing subset to process an application from an application server; (vii) returning a thread-group processing subset to a thread pool; (viii) resetting a UUID on a thread-group processing subset; and/or (ix) selecting a thread-group processing subset from a thread pool to process a second application.

Some embodiments of the present invention may include one, or more, of the following features, characteristics, and/or advantages: (i) allowing dynamic modification of a thread set; (ii) allowing a thread to remain with a thread set after use by an application; (iii) using process affinity to determine a processor on which an ID pairing runs; (iv) using process affinity to determine a processor within a plurality of processors on which an ID pairing runs; (v) determining a process affinity as an input; and/or (vi) improving process scheduling affinity by augmenting process affinity with an alternative thread allocation technique (e.g., a round robin process).

Some embodiments of the present invention may include one, or more, of the following features, characteristics, and/or advantages: (i) running a set of applications on an application server; (ii) running a set of message flows in an integration broker; (iii) sharing a thread pool among a set of applications; (iv) requesting a thread from a thread pool for an invoked application; and/or (v) returning a thread to a thread pool when the invoked application is completed.

In some embodiments of the present invention, the following process operations are performed: (i) enabling a logical organization of threads in a thread pool into a set of thread sets; (ii) ensuring a UUID for a thread set across a system; (iii) generating a second UUID for a thread corresponding to an application running on the thread; (iv) retaining a UUID for an application (after execution of a first ID pairing on a first thread) for later use in execution of a second ID pairing for the application on a second thread; and/or (v) retaining a UUID for an application (after execution of a first ID pairing on a first thread) for later use in execution of a second ID pairing for the application on the first thread.

Some embodiments of the present invention may include one, or more, of the following features, characteristics, and/or advantages: (i) using a CPU dispatcher to allocate ID pairing to a set of processors; (ii) using a CPU dispatcher to allocate ID pairing to a set of processors based, at least in part, on a first ID and a second ID; (iii) using a CPU scheduler to schedule execution of ID pairing to a set of processors; (iv) using a CPU scheduler to schedule execution of ID pairing to a set of processors based, at least in part, on a first ID and a second ID; (v) improving allocation of processing on non-uniform memory access ("NUMA") architectures and/or complex systems; (vi) improving performance of allocating and/or processing ID pairing; and/or (vii) improving efficiency of allocating and/or processing ID pairing.

Some embodiments of the present invention may include one, or more, of the following features, characteristics, and/or advantages: (i) providing additional context to a CPU dispatcher with regard to processing of an ID pairing; (ii) providing additional context to a CPU dispatcher with regard to processing of an ID pairing based, at least in part, on a first UUID and a second UUID; (iii) storing to a cache a processor on which processing an ID pairing occurred; (iv) using processing within a thread set to allocate a workload to a processor; (v) using processing within a thread set to allocate a workload to a processor to improve memory locality; (vi) using a thread set to allocate a workload to a processor; (v) using a thread set to allocate a workload to a processor to improve memory locality; (vi) obtaining an UUID for an ID pairing when retrieving a thread from a thread pool; and/or (vii) obtaining an UUID for an ID pairing when returning a thread to a thread pool.

Some embodiments of the present invention may include one, or more, of the following features, characteristics, and/or advantages: (i) a thread set and an application each having a UUID to be used by a CPU dispatcher to improve memory locality of processing; (ii) a plurality of UUIDs are set on a thread when retrieving the thread from and/or returning the thread to a thread pool; (iii) a plurality of UUIDs are generated (a first UUID associated with a thread set and a second UUID associated with an application); (iv) a UUID is used by a CPU dispatcher to improve memory locality; and/or (v) a set of UUIDs are managed when a set of threads are taken from and/or returned to a thread pool.

Some embodiments of the present invention may include one, or more, of the following features, characteristics, and/or advantages: (i) storing a first UUID identifying a thread set and a second UUID identifying processing of an application; (ii) defining a first UUID and a second UUID associated with a thread when requesting the thread from and/or returning the thread to a thread pool; (iii) augmenting a CPU dispatcher with a first UUID and a second UUID associated with a thread to more efficiently allocate a set of ID pairings to a set of processors; (iv) optimizing selection of a processor of a set of processors on which to process an ID pairing based, at least in part, on a memory locality of a processor; and/or (v) improving the functioning of a computer by more efficiently allocating a set of ID pairings to a set of processors.

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:
1. A method comprising:
identifying a thread set for running at least a first application;

generating a first identification corresponding to the thread set, wherein the first identification is stored on each thread in the thread set;
requesting a first thread from the thread set;
generating a second identification corresponding to the first application;
storing the second identification on the first thread;
allocating a first ID pairing to a first processor, wherein the first ID pairing represents a pairing of the first application with the first thread and includes:
the first identification, and
the second identification; and
executing, on the first processor, the first thread based, at least in part, on the first ID pairing;
wherein:
at least executing the first thread is performed by computer software running on computer hardware.

2. The method of claim 1, wherein one or more of: (i) the thread set is a set of threads from a thread pool for which the set of threads perform a set of common processing tasks, (ii) the first identification includes at least one of a universally unique identifier and a system-wide unique identifier, and (iii) the second identification includes at least one of a universally unique identifier and a system-wide unique identifier.

3. The method of claim 1, wherein generating the first identification includes:
requesting the first identification from an operating system; and
storing the first identification to each thread in the thread set.

4. The method of claim 1, wherein generating the second identification includes:
requesting the second identification from an operating system; and
storing the second identification to the first thread.

5. The method of claim 1, further comprising:
resetting the second identification on the first thread; and
returning the first thread to the thread set.

6. The method of claim 5, further comprising:
requesting a second thread from the thread set;
storing the second identification on the second thread; and
executing, on the first processor, the second thread based, at least in part, on the first ID pairing.

7. The method of claim 5, further comprising:
requesting a third thread from the thread set;
generating a third identification corresponding to a second application;
storing the third identification on the third thread;
allocating a second ID pairing to a second processor, wherein the first ID pairing includes:
the first identification, and
the third identification; and
executing, on the second processor, the third thread based, at least in part, on the second ID pairing.

8. A computer program product comprising:
a computer readable storage medium having stored thereon:
first instructions executable by a device to cause the device to identify a thread set for running at least a first application;
second instructions executable by a device to cause the device to generate a first identification corresponding to the thread set, wherein the first identification is stored on each thread in the thread set;
third instructions executable by a device to cause the device to request a first thread from the thread set;
fourth instructions executable by a device to cause the device to generate a second identification corresponding to the first application;
fifth instructions executable by a device to cause the device to store the second identification on the first thread;
sixth instructions executable by a device to cause the device to allocate a first ID pairing to a first processor, wherein the first ID pairing represents a pairing of the first application with the first thread and includes:
the first identification, and
the second identification; and
seventh instructions executable by a device to cause the device to execute, on the first processor, the first thread based, at least in part, on the first ID pairing.

9. The computer program product of claim 8, wherein one or more of: (i) the thread set is a set of threads from a thread pool for which the set of threads perform a set of common processing tasks, (ii) the first identification includes at least one of a universally unique identifier and a system-wide unique identifier, and (iii) the second identification includes at least one of a universally unique identifier and a system-wide unique identifier.

10. The computer program product of claim 8, wherein second instructions to generate the first identification corresponding to the thread set include:
eighth instructions executable by a device to cause the device to request the first identification from an operating system; and
ninth instructions executable by a device to cause the device to store the first identification to each thread in the thread set.

11. The computer program product of claim 8, wherein fourth instructions to generate the second identification corresponding to the first application include:
eighth instructions executable by a device to cause the device to request the second identification from an operating system; and
ninth instructions executable by a device to cause the device to store the second identification to the first thread.

12. The computer program product of claim 8, further comprising:
eighth instructions executable by a device to cause the device to reset the second identification on the first thread; and
ninth instructions executable by a device to cause the device to return the first thread to the thread set.

13. The computer program product of claim 12, further comprising:
tenth instructions executable by a device to cause the device to request a second thread from the thread set;
eleventh instructions executable by a device to cause the device to store the second identification on the second thread; and
twelfth instructions executable by a device to cause the device to execute, on the first processor, the second thread based, at least in part, on the first ID pairing.

14. The computer program product of claim 12, further comprising:
tenth instructions executable by a device to cause the device to request a third thread from the thread set;
eleventh instructions executable by a device to cause the device to generate a third identification corresponding to a second application;

twelfth instructions executable by a device to cause the device to store the third identification on the third thread;
thirteenth instructions executable by a device to cause the device to allocate a second ID pairing to a second processor, wherein the first ID pairing includes:
the first identification, and
the third identification; and
fourteenth instructions executable by a device to cause the device to execute, on the second processor, the third thread based, at least in part, on the second ID pairing;
eleventh instructions executable by a device to cause the device to generate a third identification corresponding to a second application;
twelfth instructions executable by a device to cause the device to store the third identification on the third thread;
thirteenth instructions executable by a device to cause the device to allocate a second ID pairing to a second processor, wherein the first ID pairing includes:
the first identification, and
the third identification; and
fourteenth instructions executable by a device to cause the device to execute, on the second processor, the third thread based, at least in part, on the second ID pairing.

15. A computer system comprising:
a processor set; and
a computer readable storage medium;
wherein:
the processor set is structured, located, connected, and/or programmed to execute instructions stored on the computer readable storage medium; and
the instructions include:
first instructions executable by a device to cause the device to identify a thread set for running at least a first application;
second instructions executable by a device to cause the device to generate a first identification corresponding to the thread set, wherein the first identification is stored on each thread in the thread set;
third instructions executable by a device to cause the device to request a first thread from the thread set;
fourth instructions executable by a device to cause the device to generate a second identification corresponding to the first application;
fifth instructions executable by a device to cause the device to store the second identification on the first thread;
sixth instructions executable by a device to cause the device to allocate a first ID pairing to a first processor, wherein the first ID pairing represents a pairing of the first application with the first thread and includes:
the first identification, and
the second identification; and
seventh instructions executable by a device to cause the device to execute, on the first processor, the first thread based, at least in part, on the first ID pairing.

16. The computer system of claim 15, wherein one or more of: (i) the thread set is a set of threads from a thread pool for which the set of threads perform a set of common processing tasks, (ii) the first identification includes at least one of a universally unique identifier and a system-wide unique identifier, and (iii) the second identification includes at least one of a universally unique identifier and a system-wide unique identifier.

17. The computer system of claim 15, wherein second instructions to generate the first identification corresponding to the thread set include:
eighth instructions executable by a device to cause the device to request the first identification from an operating system; and
ninth instructions executable by a device to cause the device to store the first identification to each thread in the thread set.

18. The computer system of claim 15, further comprising:
eighth instructions executable by a device to cause the device to reset the second identification on the first thread; and
ninth instructions executable by a device to cause the device to return the first thread to the thread set.

19. The computer system of claim 18, further comprising:
tenth instructions executable by a device to cause the device to request a second thread from the thread set;
eleventh instructions executable by a device to cause the device to store the second identification on the second thread; and
twelfth instructions executable by a device to cause the device to execute, on the first processor, the second thread based, at least in part, on the first ID pairing.

20. The computer system of claim 18, further comprising:
tenth instructions executable by a device to cause the device to request a third thread from the thread set;
eleventh instructions executable by a device to cause the device to generate a third identification corresponding to a second application;
twelfth instructions executable by a device to cause the device to store the third identification on the third thread;
thirteenth instructions executable by a device to cause the device to allocate a second ID pairing to a second processor, wherein the first ID pairing includes:
the first identification, and
the third identification; and
fourteenth instructions executable by a device to cause the device to execute, on the second processor, the third thread based, at least in part, on the second ID pairing.

* * * * *